(12) United States Patent
Chen et al.

(10) Patent No.: US 8,266,713 B2
(45) Date of Patent: Sep. 11, 2012

(54) METHOD, SYSTEM AND CONTROLLER FOR TRANSMITTING AND DISPATCHING DATA STREAM

(75) Inventors: Meng-Chang Chen, Taichung County (TW); Sing-Chang Liu, Taipei (TW)

(73) Assignee: Phison Electronics Corp., Miaoli (TW)

( * ) Notice: Subject to any disclaimer, the term of this patent is extended or adjusted under 35 U.S.C. 154(b) by 973 days.

(21) Appl. No.: 12/059,032

(22) Filed: Mar. 31, 2008

(65) Prior Publication Data

US 2009/0187709 A1    Jul. 23, 2009

(30) Foreign Application Priority Data

Jan. 23, 2008  (TW) ................................ 97102473 A

(51) Int. Cl.
*G06F 21/00* (2006.01)
(52) U.S. Cl. ................ 726/29; 726/27; 726/26; 726/16; 726/17; 726/2; 711/115; 711/103; 711/100; 711/170; 711/172; 713/193
(58) Field of Classification Search .................. None
See application file for complete search history.

(56) References Cited

U.S. PATENT DOCUMENTS

| | | | | |
|---|---|---|---|---|
| 6,298,412 B1 * | 10/2001 | Yatsu et al. | ................... | 711/101 |
| 7,093,063 B2 * | 8/2006 | Shona | ........................... | 711/103 |
| 7,290,284 B1 * | 10/2007 | Wettergren | ..................... | 726/27 |
| 7,369,438 B2 * | 5/2008 | Lee | .......................... | 365/185.17 |
| 7,386,655 B2 * | 6/2008 | Gorobets et al. | ............. | 711/103 |
| 7,412,560 B2 * | 8/2008 | Smith et al. | ................... | 711/103 |
| 7,526,601 B2 * | 4/2009 | Shona | ........................... | 711/103 |
| 7,529,905 B2 * | 5/2009 | Sinclair | .......................... | 711/170 |
| 7,558,906 B2 * | 7/2009 | Sinclair et al. | ................ | 711/103 |
| 7,726,568 B2 * | 6/2010 | Singh et al. | .................... | 235/451 |
| 7,773,420 B2 * | 8/2010 | Kim | ......................... | 365/185.08 |
| 8,055,978 B2 * | 11/2011 | Kim et al. | ..................... | 714/769 |
| 8,078,885 B2 * | 12/2011 | Jobmann | ....................... | 713/186 |
| 2003/0212895 A1 * | 11/2003 | Kisliakov | ...................... | 713/185 |
| 2005/0273385 A1 * | 12/2005 | Vandervoort | ................... | 705/14 |
| 2007/0136610 A1 * | 6/2007 | Lambinet | ...................... | 713/193 |
| 2007/0233910 A1 * | 10/2007 | Paley et al. | .................... | 710/36 |
| 2008/0183978 A1 * | 7/2008 | Sohn | .............................. | 711/154 |
| 2009/0014519 A1 * | 1/2009 | Singh et al. | .................... | 235/437 |

FOREIGN PATENT DOCUMENTS

TW           I220496           8/2004

OTHER PUBLICATIONS

"Office Action of Taiwan Counterpart Application", issued on Nov. 29, 2011, p. 1-p. 5, in which the listed reference was cited.

* cited by examiner

*Primary Examiner* — Syed A. Zia
(74) *Attorney, Agent, or Firm* — J.C. Patents

(57) ABSTRACT

A method for transmitting and dispatching data stream, which is used for transmitting data stream to a storage device having a non-volatile memory and a smart card chip from a host, is provided. The method includes: setting a key between the host and the storage device; creating a temporary file in the non-volatile memory; verifying the temporary file based on the key; recording a logical block address of the temporary file when verification of the temporary file is successful; and judging whether the data stream from the host is written at the logical block address, wherein the data stream is identified to be a command-application protocol data unit (C-APDU) and is dispatched to the smart card chip when the data stream from the host is written at the logical block address. Accordingly, it is possible to efficiently distinguish a general data from a command of the smart card chip.

20 Claims, 7 Drawing Sheets

METHOD, SYSTEM AND CONTROLLER FOR TRANSMITTING AND DISPATCHING DATA STREAM

CROSS-REFERENCE TO RELATED APPLICATION

This application claims the priority benefit of Taiwan application serial no. 97102473, filed on Jan. 23, 2008. The entirety of the above-mentioned patent application is hereby incorporated by reference herein and made a part of this specification.

BACKGROUND

1. Technology Field

The present invention relates to a method for transmitting and dispatching data stream. More particularly, the present invention relates to a method, a system and a controller thereof for transmitting and dispatching data stream to a storage device having a non-volatile memory and a smart card chip from a host.

2. Description of Related Art

As electronic wallets and pre-payments are gradually accepted by users, smart cards are widely used. The smart card is an integrated circuit chip having components such as a microprocessor, a card operating system, a security module and a memory etc. for performing a predetermined operation. The smart card provides functions of calculation, encryption, two-way communication and security, so that besides data storage, the smart card may provide a protection for the data stored therein. A subscriber identification module (SIM) card utilized in a cell phone applying a global system for mobile communication (GSM) is an application example of the smart card. However, since storage volumes of the smart cards are limited, memory cards with large volume are combined to the smart cards recently for increasing the storage volumes of the smart cards.

The memory card is a data storage device applying a NAND flash memory as a storage media thereof. The NAND flash memory has the advantages of writable, erasable, and may still maintain data during power-off. Moreover, the NAND flash memory is one of non-volatile memories which have the features of small size, fast accessing and lower power consumption, and during data erasing of the non-volatile memory, data stored therein may be erased block by block, and therefore the non-volatile memory also has the advantage of fast operating speed.

In a conventional technique, in application of combining the flash memory with the smart card, data transmitted to the smart card or the flash memory is distinguished by a specific command. However, a problem that hardware devices or drivers cannot support the specific command may occur. Moreover, in the conventional technique, whether or not data stream is complied with a command format of the smart card is judged by comparing type information of the transmitted data stream within the specific command. However, such method generally leads to a collision problem between a general file data and the command format of the smart card (i.e. the general file data is misjudged to be the data stream of the smart card).

Therefore, in the application of combining the flash memory with the smart card, a method for effectively judging whether or not the transmitted data is the smart card command is required to be developed.

SUMMARY

The present invention is directed to a system for transmitting and dispatching data stream, which may effectively distinguish a general data from a smart card chip command.

The present invention is directed to a method for transmitting and dispatching data stream, which may effectively distinguish a general data from a smart card chip command.

The present invention is directed to a controller, which may perform a procedure for transmitting and dispatching data stream, so as to effectively distinguish a general data from a smart card chip command.

The present invention provides a system for transmitting and dispatching data stream, which is used for transmitting data stream to a storage device having a non-volatile memory and a smart card chip from a host. The system for transmitting and dispatching data stream includes an application program and a controller. The application program is installed on the host and is used for operating the storage device. The controller is disposed in the storage device and is electrically connected to the non-volatile memory and the smart card chip. Wherein, the controller has a key, and may verify a key verification writing command according to the key. Moreover, the controller records a logical block address of a temporary file in the non-volatile memory to be written by the key verification writing command when the verification of the key verification writing command is successful, and meanwhile the controller judges whether or not the data stream transmitted to the storage device form the host is written at the logical block address. If the data stream is written at the logical block address, the data stream is then identified to be a communication data unit of the smart card, and is dispatched to the smart card chip.

In an embodiment of the present invention, the application program sets the key on the controller, and creates the temporary file on the non-volatile memory, wherein the logical block address is a logical address of the temporary file.

In an embodiment of the present invention, the application program transmits the key to the controller via a secure command, and the controller stores the key and sends a key setting acknowledge message to the application program for notifying whether or not the key is successfully set.

In an embodiment of the present invention, the controller receives the key verification writing command from the application program, wherein the key verification writing command writes a randomize value and a disturb value into the temporary file, and the disturb value is obtained by encrypting the randomize value via the key. Also, the controller obtains a restored randomize value by decrypting the disturb value via the key, and compares the restored randomize value with the randomize value, wherein when the restored randomize value is the same to the randomize value, it is determined the verification of the key verification writing command is successful.

In an embodiment of the present invention, the controller further transmits a key verification response message including the restored randomize value to the host.

In an embodiment of the present invention, the controller further receives a response data unit from the smart card chip, and transmits the response data unit to the application program according to a read command of the application program. Moreover, the controller further erases the logical block address and notifies the application program to close the temporary file after transmitting the response data unit.

In an embodiment of the present invention, the controller further repeatedly judges whether or not the data stream transmitted to the storage device from the host is written at the logical block address until a termination command is received from the application program, and erases the logical block address and notifies the application program to close the temporary file after receiving the termination command.

In an embodiment of the present invention, the key verification writing command includes a verification key type field, a randomize value field and a disturb value field. The verification key type field records whether or not the communication data unit may be repeatedly transmitted to the smart card chip after the key verification. The randomize value field records the randomize value, and the disturb value field records the disturb value.

In an embodiment of the present invention, the key verification response message includes a restored randomize value field for recording the restored randomize value.

In an embodiment of the present invention, the storage device is a SD interface memory card or a multi media card (MMC) interface memory card.

In an embodiment of the present invention, the smart card chip is complied with an ISO 7816 standard or an ISO 14443 standard.

In an embodiment of the present invention, the non-volatile memory is a single level cell (SLC) NAND flash memory or a multi level cell (MLC) NAND flash memory.

In an embodiment of the present invention, the communication data unit is a command-application protocol data unit (C-APDU), and the response data unit is a response-application protocol data unit (R-APDU).

The present invention provides a method for transmitting and dispatching data stream, which is used for transmitting data stream to a storage device having a non-volatile memory and a smart card chip from a host. The method is as follows. First, a key is set between the host and the storage device. Next, a temporary file is created in the non-volatile memory of the storage device, and a key verification writing command is executed. Next, the key verification writing command is verified through the key. Next, a logical block address of the temporary file to be written by the key verification writing command is recorded when the verification of the key verification writing command is successful. Next, whether or not the data stream transmitted to the storage device from the host is written at the logical block address is judged, wherein if the data stream is written at the logical block address, the data stream is then identified to be a communication data unit of the smart card chip, and is dispatched to the smart card chip.

In an embodiment of the present invention, the step of setting the key between the host and the storage device is as follows. First, the key is transmitted to the storage device from the host via a secure command. Next, the key is stored. Finally, a key setting acknowledge message is read from the storage device for judging whether or not the key is successfully set.

In an embodiment of the present invention, the step of verifying the key verification writing command through the key is as follows. First, a randomize value and a disturb value is written into the temporary file, wherein the disturb value is obtained by encrypting the randomize value via the key. Next, a restored randomize value is obtained by decrypting the disturb value within the storage device via the key. Finally, the restored randomize value is compared to the randomize value, wherein when the restored randomize value is the same to the randomize value, it determined the verification of the key verification writing command is successful.

In an embodiment of the present invention, the step of verifying the key verification writing command through the key further includes the following steps. First, a key verification response message including the restored randomize value is read from the storage device. Next, whether or not the restored randomize value equals to the originally written randomize value is judged, wherein if the restored randomize value equals to the originally written randomize value, it is determined the verification of the key verification writing command is successful.

In an embodiment of the present invention, the method for transmitting and dispatching data stream further includes transmitting a response data unit after the smart card receives the data stream.

In an embodiment of the present invention, the method for transmitting and dispatching data stream further includes erasing the logical block address and closing the temporary file after the host receives the response data unit.

In an embodiment of the present invention, the method for transmitting and dispatching data stream further includes repeatedly judging whether or not the data stream transmitted to the storage device from the host is written at the logical block address until a termination command is received.

In an embodiment of the present invention, the method for transmitting and dispatching data stream further includes erasing the logical block address and closing the temporary file after the termination command is received.

The present invention provides a controller, which is used for a storage device having a non-volatile memory and a smart card chip. The flash memory controller includes a micro processing unit, a memory interface coupled to the micro processing unit, a buffer memory coupled to the micro processing unit and a data dispatching module coupled to the micro processing unit. The memory interface is used for accessing the non-volatile memory. The buffer memory is used for temporarily storing data. The data dispatching module has a key and is used for verifying a key verification writing command received from a host through the key, and is used for recording a logical block address of a temporary file in the non-volatile memory to be written by the key verification writing command when verification of the key verification writing command is successful and judging whether or not a data stream transmitted to the storage device from the host is written at the logical block address. Wherein, when the data stream is written at the logical block address, the data steam is then identified to be a communication data unit of the smart card chip and is dispatched to the smart card chip.

In an embodiment of the present invention, the key is set by the host.

In an embodiment of the present invention, the data dispatching module receives the key from the host via a secure command, stores the key and transmits a key setting acknowledge message to the host for notifying whether or not the key is successfully set.

In an embodiment of the present invention, the data dispatching module receiving the key verification writing command which commands to write a randomize value and a disturb value obtained by encrypting the randomize value via the key into the temporary file by the host from the host, obtains a restored randomize value by decrypting the disturb value through the key and compares the restored randomize value to the randomize value, and when the restored randomize value equals to the randomize value, it is determined the verification of the key verification writing command is successful.

In an embodiment of the present invention, the data dispatching module transmits a key verification response message including the restored randomize value to the host.

In an embodiment of the present invention, the data dispatching module further receives a response data unit from the smart card chip, and transmits the response data unit to the host according to a read command of the host, and meanwhile erases the logical block address and notifies the host to close the temporary file after transmitting the response data unit.

In an embodiment of the present invention, the data dispatching module further repeatedly judges whether or not the data stream transmitted to the storage device from the host is written at the logical block address until a termination command is received from the host, and erases the logical block address and notifies the host to close the temporary file after receiving the termination command.

In an embodiment of the present invention, the key verification writing command includes a verification key type field, a randomize value field and a disturb value field. The verification key type field records whether or not the C-APDU may be repeatedly transmitted to the smart card chip after the key verification. The randomize value field records the randomize value, and the disturb value field records the disturb value.

In an embodiment of the present invention, the key verification response message includes a restored randomize value field for recording the restored randomize value.

In an embodiment of the present invention, the storage device is a SD interface memory card or a MMC interface memory card.

In an embodiment of the present invention, the smart card chip is complied with an ISO 7816 standard or an ISO 14443 standard.

In an embodiment of the present invention, the non-volatile memory is a SLC NAND flash memory or a MLC NAND flash memory.

In an embodiment of the present invention, the communication data unit is a C-APDU, and the response data unit is a R-APDU.

The present invention provides a method for transmitting and dispatching data stream, which is used for receiving data stream to be transmitted to a storage device having a non-volatile memory and a smart card chip from a host. The method is as follows. First, a key verification writing command received from a host is verified based on a key, and a logical block address of a temporary file in the non-volatile memory to be written by the key verification writing command is recorded when the verification of the key verification writing command is successful. Next, whether or not the data stream transmitted to the storage device from the host is written at the logical block address is judged, wherein when the data stream is written at the logical block address, the data stream is then identified to be a communication data unit of the smart card chip, and is dispatched to the smart card chip.

In the present invention, a dual verification mechanism of verifying the key and verifying the logical block address (LBA) of the temporary file is applied for judging whether or not the transmitted data stream is a command of the smart card chip, and therefore a chance that the data stream is miss-transmitted to the smart card chip is effectively reduced, and the performance of the system is improved accordingly.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
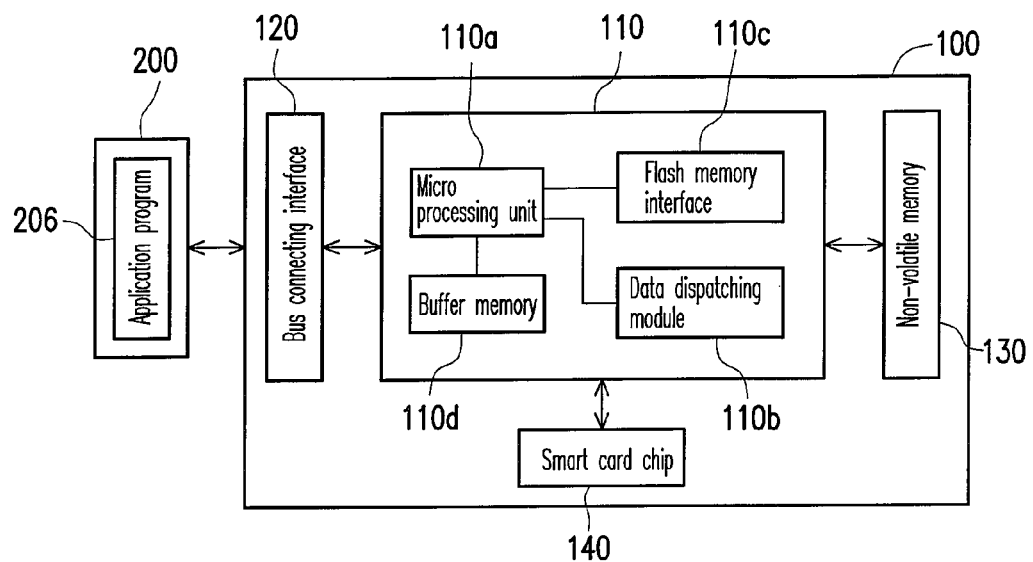
FIG. 1 is schematic block diagram illustrating a system for transmitting and dispatching data stream according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention provides a data stream transmitting and dispatching system including an application program and a controller, wherein the application program and the controller are respectively configured in a host system and a storage device, by which a key established between the host system and the storage device and a specific logical block address may be verified for correctly judging whether or not the data steam is a command to be transmitted to the smart card.

[First Embodiment]

FIG. 1 is schematic block diagram illustrating a system for transmitting and dispatching data stream according to a first embodiment of the present invention.

Referring to FIG. 1, the system for transmitting and dispatching data stream includes an application program 206 and a controller 110. The application program 206 is installed at a host system 200, and the controller 110 is disposed on a storage device 100. Generally, the storage device 100 is utilized together with the host system 200, so that the host system 200 may write data into the storage device 100 or read data from the storage device 100. To be specific, the storage device 100 includes a non-volatile memory 130 used for storing general data and a smart card chip 140 used for executing functions such as security verification etc. The application program 206 and the controller 110 may apply a method of the present invention for transmitting and dispatching the data stream, so as to correctly judge whether or not the data stream is a communication data unit transmitted to the smart card. Detailed function of the devices shown in FIG. 1 is described below.

The controller 110 controls a whole operation in the storage device 100. For example, dispatching, storing, reading or erasing of the data stream. The controller 110 includes a micro processing unit 110a, a data dispatching module 110b, a flash memory interface 110c and a buffer memory 110d.

The micro processing unit 110a controls operations of components within the controller 100.

The data dispatching module 110b is electrically connected to the micro processing unit 110a. The data dispatching module 110b may communicate with the host system 200 in advance for setting the key, and may verify a temporary file established by the host system 200 according to the key, and record a logical block address (LBA) of the temporary file.

Consequently, when the host system 200 transmits the data stream to the storage device 100, the data dispatching module 110b then judges whether or not the data stream transmitted by the host system 200 is written at the logical block address. Wherein, if the data stream is written at the logical block address, the data stream is then identified to be the communication data unit provided to the smart card chip 140, and is dispatched to the smart card chip 140. In the present embodiment, the communication data unit is a command-application protocol data unit (C-APDU) complied with an ISO 7816 standard. The method for transmitting and dispatching the data stream will be described in detail with reference of FIGS. 3A~3C.

The flash memory interface 110c is electrically connected to the micro processing unit 110a and is used for accessing the non-volatile memory 130. Namely, data to be written into the non-volatile memory 130 by the host system 200 is transferred into a format that may be accepted by the non-volatile memory 130 via the flash memory interface 110c.

The buffer memory 110d is used for temporarily storing system data (for example a logical physical mapping table) or data to be read or written by the host system 200. In the present embodiment, the buffer memory 110d is a static random access memory (SRAM). However, it should be understood that the present invention is not limited thereto, and a dynamic random access memory (DRAM), a magnetoresistive random access memory (MRAM), a phase change random access memory (PRAM), a synchronous DRAM (SDRAM) or other suitable memories may also be applied.

Moreover, though not being illustrated, the controller 110 may further include functional modules commonly used within a general flash memory, such as an error correction module and a power management module etc.

The non-volatile memory 130 is electrically connected to the controller 110 and is used for storing data. In the present embodiment, the non-volatile memory 130 is a single level cell (SLC) NAND flash memory. However, the present invention is not limited thereto, in another embodiment, the non-volatile memory 130 may also be a multi level cell (MLC) (NAND) flash memory or other suitable non-volatile memories.

The smart card 140 is electrically connected to the controller 110 and is used for executing functions such as calculation, encryption, two-way communication and security verification etc. In the present embodiment, the smart card chip 140 is compatible to a contact smart card chip applying an ISO 7816 standard. However, it should be understood that the present invention is not limited thereto. For example, the smart card chip 140 may also be compatible to a non-contact smart card chip applying an ISO 14443 standard.

Besides the controller 110, the non-volatile memory 130 and the smart card chip 140, the storage device 100 further includes a bus connecting interface 120. The bus connecting interface 120 is electrically connected to the controller 110 and is used for connecting to the host system 200. In the present embodiment, the bus connecting interface 120 is a secure digital (SD) interface. It should be noted that the bus connecting interface 120 may also be other suitable interfaces. For example, if the storage device 100 is a multi media card (MMC) memory card, the bus connecting interface 120 then may be a MMC interface.

In the present embodiment, the storage device 100 is a SD memory card. It should be noted that in another embodiment of the present invention, the storage device 100 may also be a MMC memory card or other suitable memory cards.

The application program 206 is used for operating the storage device 100, so as to implement the data transmitting and dispatching method of the present invention. Moreover, it should be noted that the host system 200 also includes general functions used for connecting to the storage device 100, such as an operating system 202, a file system 204, a standard card driver 208 and a card controller 210 (shown as FIG. 2), wherein the host system 200 may be connected to the storage device 100 via the standard card driver 208 and the card controller 210, and may access the storage device 100 via the operating system 202, the file system 204 and the application program 206.

Accordingly, when the host 200 accesses the storage device 100 including the non-volatile memory 130 and the smart card chip 140, with coordination of the application program 206, the controller 110 of the present embodiment may identify whether or not the received data stream is the C-APDU of the smart card chip 140, so as to correctly transmit the data stream belonged to the C-APDU to the smart card chip 140. In the following content, flowcharts illustrating a method for transmitting and dispatching the data stream between the controller 110 and the host system 200 are described in detail with reference of FIGS. 3A~3C and FIG. 4.

Figure 3A:
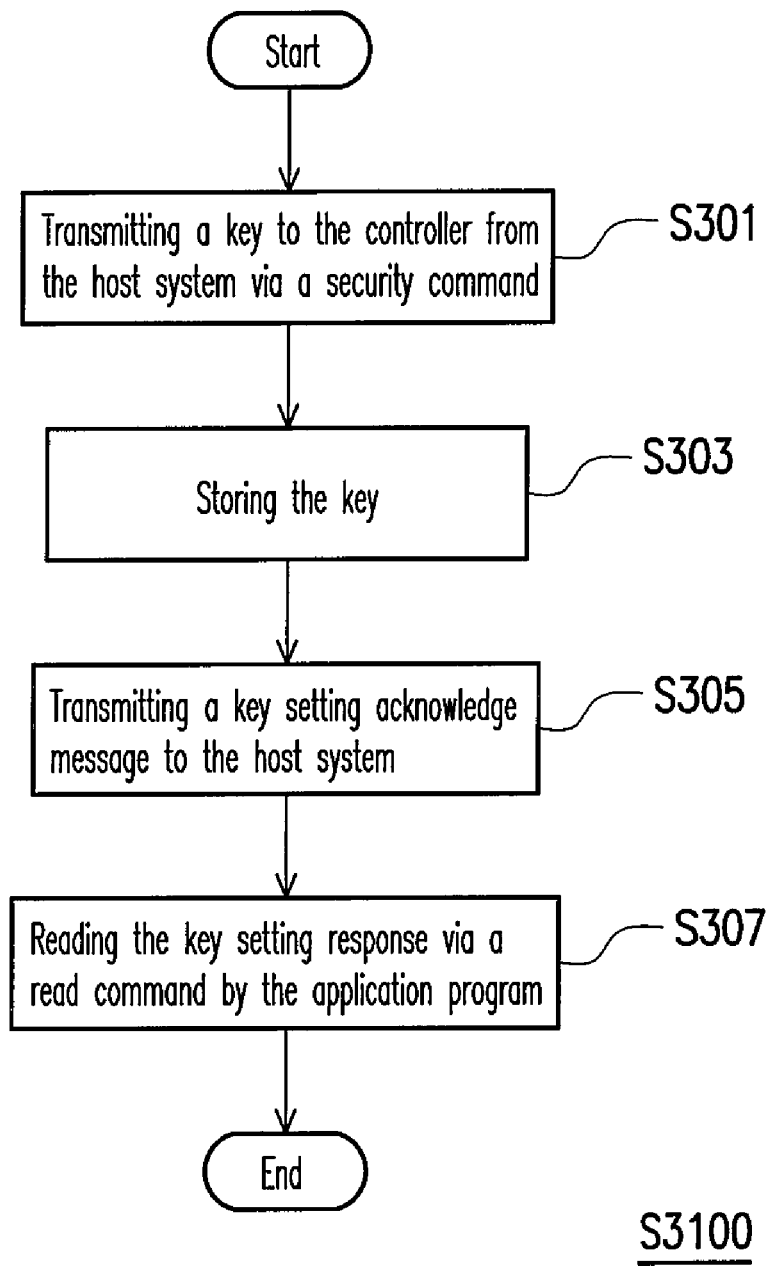
FIGS. 3A~3C are flowcharts illustrating a method for transmitting and dispatching data stream according to a first embodiment of the present invention.
Figure 3B:
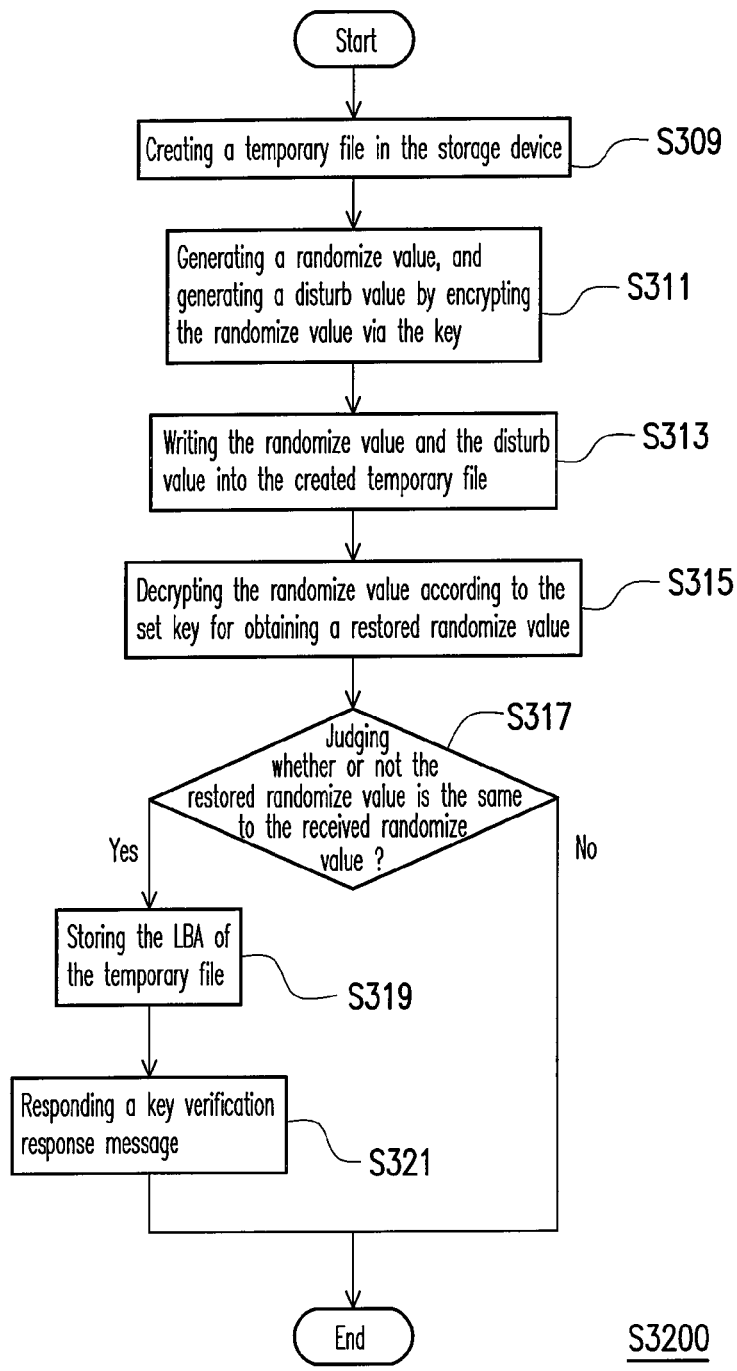
Figure 3C:
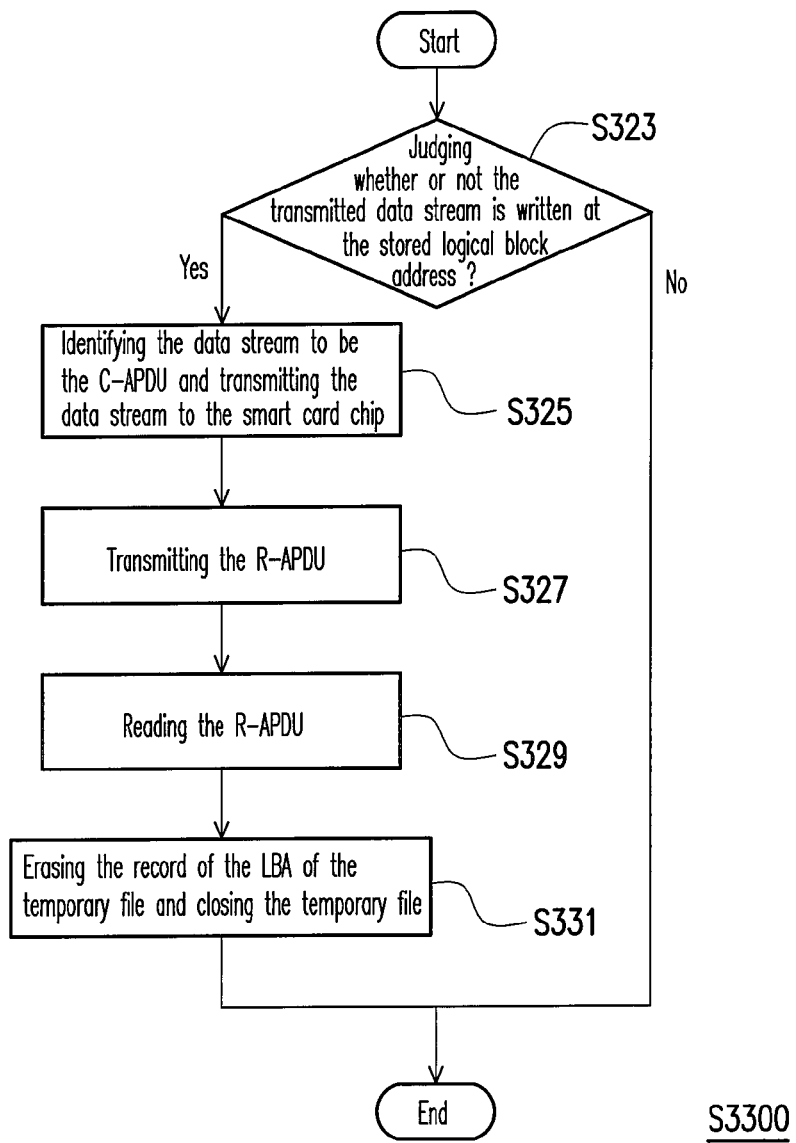
Figure 4:
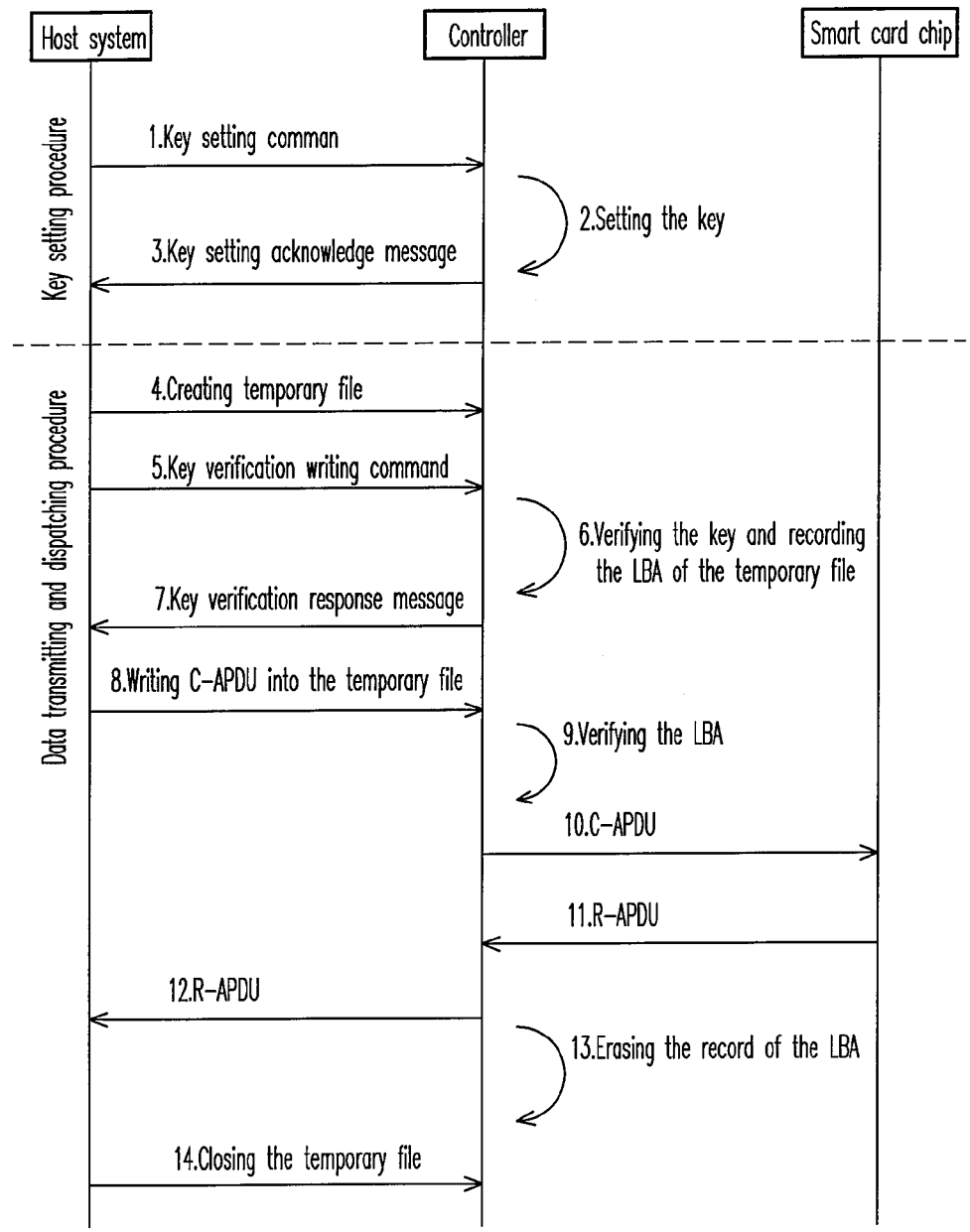
FIG. 4 is a schematic diagram illustrating a data flow based on FIGS. 3A~3C.

FIGS. 3A~3C are flowcharts illustrating a method for transmitting and dispatching data stream according to a first embodiment of the present invention. FIG. 4 is a schematic diagram illustrating a data flow based on FIGS. 3A~3C.

Referring to FIGS. 3A~3C and FIG. 4, before the smart card chip of the storage device 100 may be operated, a key has to be set to the storage device 100 (step S3100).

For example, in the step S3100, the application program 206 of the host system 200 transmits the key to the controller 110 based on a secure command (step S301). In the present embodiment, the secure command is complied with the SD card standard. Setting of the key based on the secure command complied with the SD card standard is a common technique for those skill in the art, which may be performed with reference of a SD card specification, and therefore detailed description thereof will not be repeated.

Next, the data dispatching module 110b of the controller 110 stores the key (step S303) and transmits a key setting acknowledge message to the host system 200 (step S305). The application program 206 of the host system 200 then reads the key setting acknowledge message via a read command, and thereby determinates whether or not the key is successfully set (step S307).

After the key is set to the storage device 100, when the smart card chip is about to be operated, data transmitting and dispatching then may be performed based on follow-up procedures.

When the host system 200 is about to operate the smart card chip 140 of the storage device 100, the data dispatching module 110b verifies a temporary file established on the storage device 100 by the host system 200 according to the set key (step S3200).

To be specific, in the step S3200, the application program 206 of the host system 200 first creates the temporary file on the non-volatile memory 130 of the storage device 100 (step S309). Next, the application program 206 generates a randomize value, and generates a disturb value by encrypting the randomize value via the key (S311). Next, the application program 206 sends a key verification writing command to the storage device 100 for writing the randomize value and the disturb value into the created temporary file (step S313). In step S315, the data dispatching module 110b may obtain a restored randomize value by decrypting the randomize value according to the set key when the data dispatching module 110b receives the key verification writing command. Moreover, the data dispatching module 110b may judge whether or not the restored randomize value is the same to the received randomize value by comparing the two values (S317). If the restored randomize value is the same to the received randomize value (i.e. verification thereof is successful), the data dispatching module 110b then stores the LBA of the temporary file (step S319).

Figure 5:
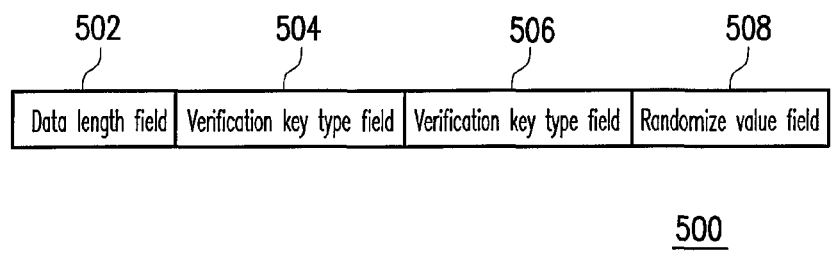
FIG. 5 is an example of a data format of a key verification writing command according to an embodiment of the present invention.

FIG. 5 is an example of a data format of a key verification writing command according to an embodiment of the present invention. Referring to FIG. 5, the data format of the key verification writing command 500 includes a data length field 502, a verification key type field 504, a disturb value field 506 and a randomize value field 508. The data length field 502 records an effective length bit of the key verification writing command. The verification key type field 504 records whether or not the C-APDU can be repeatedly transmitted to the smart card chip 140 after a key verification. In the present embodiment, the C-APDU may only be transmitted once after the key verification, for example, the verification key type field 504 is set to 0. However, in another embodiment of the present invention, the C-APDU may be transmitted for multi times after the key verification, for example, the verification key type field 504 is set to 1. The disturb value field 506 records the generated disturb value, and the randomize value field 508 records the generated randomize value.

Figure 6:
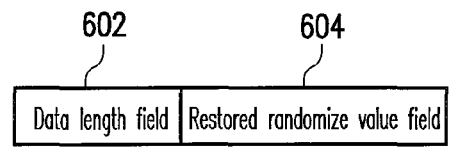
FIG. 6 is an example of a data format of a key verification response message according to an embodiment of the present invention.

To ensure the application program 206 may also confirm the result of the key verification, the data dispatching module 110b may for example respond a key verification response message to the application program 206 for transmitting the restored randomize value (step S321), so that the application program 206 may confirm the result of the key verification by comparing the restored randomize value to the originally generated randomize value. FIG. 6 is an example of a data format of a key verification response message according to an embodiment of the present invention. Referring to FIG. 6, the data format 600 of the key verification response message includes a data length field 602 and a restored randomize value field 604. The data length field 602 records an effective length bit of the key verification response message. The restored randomize value field 604 records the restored randomize value.

After the key verification procedure of the step S3200, the host system 200 then transmits the C-APDU to the smart card chip 140 of the storage device 100 via the temporary file. Namely, the storage device 100 now is in an idle state for waiting the host system 200 to transmit the C-APDU. When the storage device 100 receives the data stream form the host system 200, the data dispatching module 100b then performs data dispatching steps to the data stream transmitted from the host system 200 (step S3300).

To be specific, when the host system 200 transmits the data stream to the storage device 100, in step S323, the data dispatching module 110b then judges whether or not the transmitted data stream is written at the recorded logical block address. If the data stream is written at the recorded logical block address in the step S323, the data dispatching module 110b then transmits the data stream to the smart card chip 140 (step S325). In other words, the data dispatching module 110b judges the data stream is the C-APDU of the smart card chip 140 by judging the data stream is written at the recorded logical block address, and transmits the data stream to the smart card chip 140. Conversely, if the data stream is not written at the recorded logical block address in the step S323, the data dispatching module 110b then judges the data stream is not the C-APDU of the smart card chip 140. Namely, when the application program 206 of the host system 200 is about to transmit the C-APDU to the smart card chip, the application program 206 has to write the data stream containing the C-APDU into the temporary file, and then the data dispatching module 110b of the controller 110 judges whether or not the data stream is the C-APDU of the smart card chip 140 by judging whether or not the data stream is written at the logical block address of the temporary file. Now, the controller 100 is in an in progress state for waiting a response of the smart card chip 140. If the above judgement is affirmative, the controller 110 then transmits the C-APDU to the smart card chip 140.

In step S327, after the smart card chip 140 receives the C-APDU, the smart card chip 140 then transmits a response data unit to the controller 110 for responding reception of the C-APDU. In the present embodiment, the response data unit is a response-application protocol data unit (R-APDU) complied with the ISO 7816 standard. Now, the controller 110 is in a data available state for waiting the host system 200 to read the R-APDU. Next, the application program 206 of the host system 200 reads the R-APDU from the controller 110 via a read command (step S329). To be specific, the controller 100 may provide the R-APDU to the application program 206 by judging an address to be read by the application program 206 is the logical of the temporary file.

After the R-APDU is read, the data dispatching module 110b then erases the record of the LBA of the temporary file, and the application program 206 of the host system 200 may close the temporary file (step S331). Now, the operation of the smart card chip is completed and the controller 110 again goes back to the idle state. Wherein, closing of the temporary file represents writing or reading operation is no more performed on the temporary file, and the temporary file may be erased later at any time. It should be noted that since each time the smart cared chip is operated, the temporary file is re-created, the LBA of the created temporary file during each operation is then different. Based on a dual verification of verifying the key and the logical block address, whether or not the data stream is the C-APDU transmitted to the smart card chip then may be correctly judged.

In summary, in the storage device including a large volume non-volatile memory and the smart card chip, applying the method of the present embodiment for transmitting and dispatching the data stream may effectively identify general data from the APDU of the smart card chip. For example, a subscriber identity module (SIM) card of a cell phone and a Micro-SD memory card widely applied on the cell phones may be integrated as a single storage card, by which an identification verification function of the SIM card and a function of storing large volume data then may be simultaneously provided.

[Second Embodiment]

In the first embodiment, when the key verification is completed, the C-APDU may only be transmitted once. However, as described above, the C-APDU may also be transmitted for multi times after the key verification, so that in case of the C-APDU is repeatedly transmitted by the host system 200, decreasing of a system efficiency due to repeat key verification may be avoided.

Figure 2:
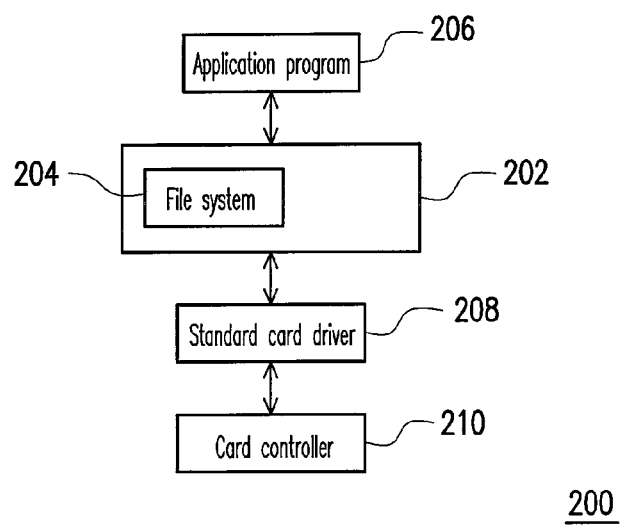
FIG. 2 is a schematic diagram of a host system of FIG. 1.

A system of the second embodiment is the same to that of the first embodiment (as shown in FIG. 1 and FIG. 2), and setting of the key and verification of the LBA of the temporary file are also the same to that of the first embodiment (as shown in FIG. 3A, FIG. 3B, FIG. 5 and FIG. 6), and thereof detailed description thereof will not be repeated.

It should be noted that in the present embodiment, multi transmission of the C-APDU to the smart card chip 140 after a single key verification is allowed, and therefore the verification key type field 504 of FIG. 5 is set to 1, so that the data dispatching module may transmit the C-APDU for multi times after a certain key verification is completed.

Figure 7:
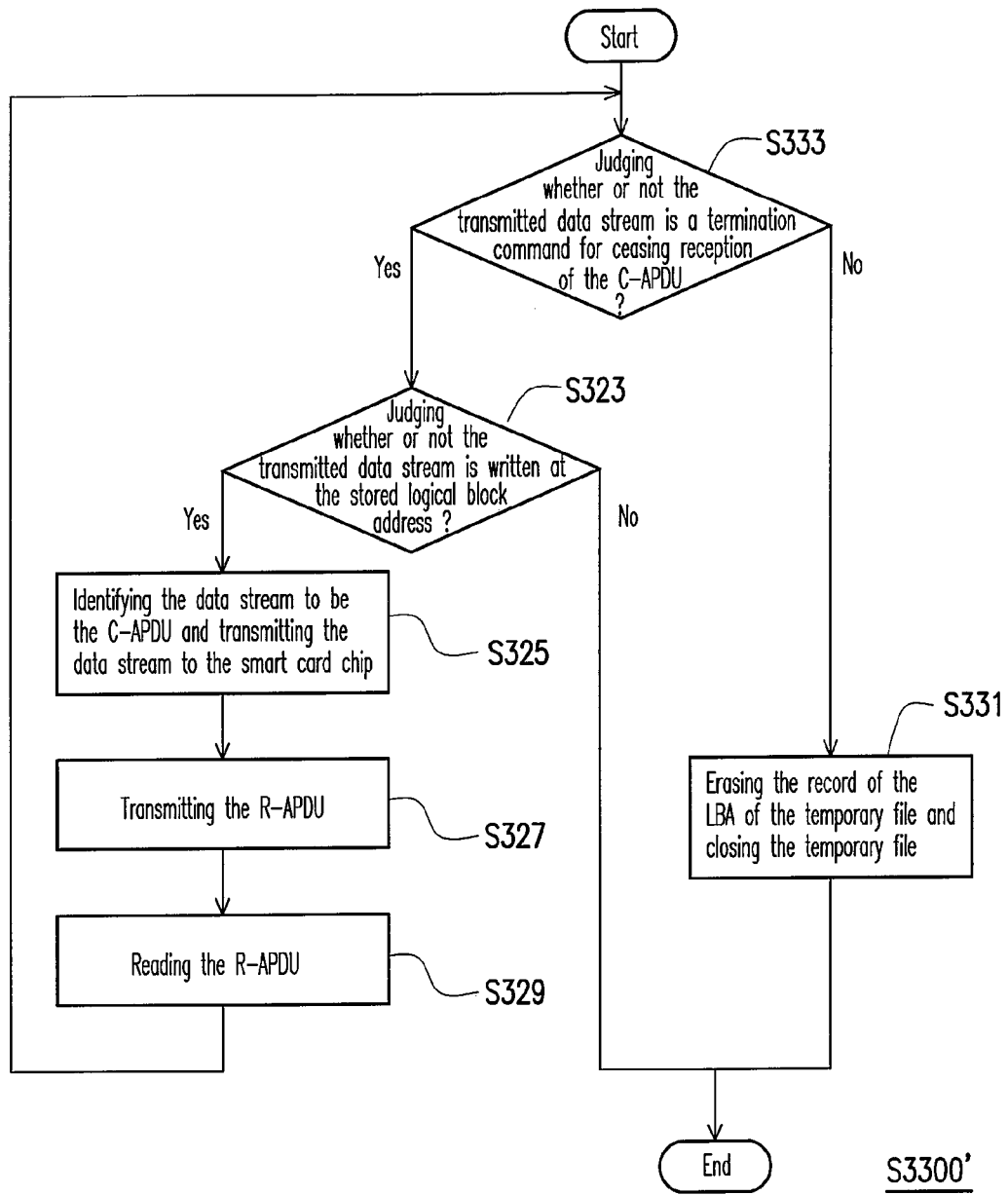
FIG. 7 is a flowchart illustrating a method for transmitting and dispatching data stream according to a second embodiment of the present invention.

FIG. 7 is a flowchart illustrating data dispatching steps 3300' of a method for transmitting and dispatching data stream according to a second embodiment of the present invention.

Referring to FIG. 7, after the key setting, the key verification and the verification of the LBA of the temporary file, the controller 110 of the storage device 100 is then in the idle state. Now, the host system 200 may transmit the C-APDU to the smart card chip 140 of the storage device 100 via the temporary file, wherein the data dispatching module 110b may perform data dispatching steps (step S3300') to the data stream transmitted by the host system 200.

To be specific, when the host system 200 transmits the data stream to the storage device 100, in step S333, the data dispatching module 110b then judges whether or not the transmitted data stream is a termination command for ceasing reception of the C-APDU. To be specific, after the key verification and the verification of the LBA of the temporary file, the storage device 100 is in a state that may receive the C-APDU of the smart card chip 140 for multi times. Therefore, the termination command is required for ceasing the state of multi reception of the C-APDU by the storage device 100. In the present embodiment, the termination command is represent by 0x00 of 512 bytes.

If the data steam is judged to be not the termination command for ceasing reception of the C-APDU in the step S333, the data dispatching module 110b then judges whether or not the data steam is written at the recorded logical block address in the step S323.

If the data stream is written at the recorded logical block address in the step S323, the data dispatching module 110b then transmits the data stream to the smart card chip 140 (step S325). In other words, the data dispatch module 110b judges the data stream is the C-APDU of the smart card chip by judging the data stream is written at the recorded logical block address, and transmits the data stream to the smart card chip 140. Conversely, if the data stream is not written at the recorded logical block address in the step S323, the data dispatching module 110b then judges the data stream is not the C-APDU of the smart card chip 140.

In step S327, the smart card chip 140 transmits a R-APDU to the controller 110 for responding reception of the C-APDU. Next, the application program 206 of the host system 200 may read the K-APDU from the controller 110 via the read command (step S329). To be specific, the controller 100 may provide the R-APDU to the application program 206 by judging an address to be read by the application program 206 is the logical address of the temporary file.

If the data stream is judged to be the termination command for ceasing reception of the C-APDU in the step S333, the data dispatching module 110b then erases the record of the LBA of the temporary file, and the application program 206 of the host system 200 may close the temporary file (step S331). Now, the operation of the smart card chip is completed. Wherein, closing of the temporary file represents writing or reading operation is no more performed on the temporary file, and the temporary file may be erased later at any time.

The data transmitting and dispatching procedure of the present embodiment also has the advantages as that of the first embodiment, and since multi transmission of the C-APDU to the smart card chip may be performed after the key verification, decreasing of a system performance due to repeat the key verification may be avoided.

In summary, by verifying the key and the LBA of the temporary file before the C-APDU is transmitted, and transmitting the data stream to the smart card chip after the verification is successful, miss-transmission of the data stream to the smart card chip may be effectively reduced, and accordingly the performance of the system is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for transmitting and dispatching data stream, suitable for transmitting data stream to a storage device having a non-volatile memory and a smart card chip from a host, the system for transmitting and dispatching data stream comprising:
   an application program, installed on the host and used for operating the storage device; and
   a controller, disposed in the storage device and electrically connected to the non-volatile memory and the smart card chip,
   wherein the application program transmits a key to the controller, and the controller stores the key,
   wherein the application program creates a temporary file on a logical block address of the non-volatile memory, generates a first value, generates a second value by encrypting the first value via the key and transmits a key verification writing command for writing the first value and the second value into the temporary file to the controller,
   wherein the controller receives the key verification writing command with the first value and the second value, decrypts the received second value to obtain a third value, determines whether the third value is the same as the received first value and when the third value is the same as the received first value, records the logical block address of the temporary file,
   wherein the controller judges whether the data stream transmitted to the storage device from the host is written to the logical block address of the temporary file, and
   when the data stream is written to the logical block address of the temporary file, the data stream is then judged to be a communication data unit of the smart card chip, and the controller dispatches the data stream to the smart card chip.

2. The system for transmitting and dispatching data stream as claimed in claim 1, wherein the application program transmits the key to the controller via a secure command, and the controller stores the key and transmits a key setting acknowledge message to the application program for notifying whether or not the key is successfully set.

3. The system for transmitting and dispatching data stream as claimed in claim 1, wherein the controller further transmits a key verification response message including the third value to the host.

4. The system for transmitting and dispatching data stream as claimed in claim 1, wherein the controller further receives a response data unit from the smart card chip, transmits the response data unit to the application program according to a read command of the application program, and erases the logical block address and notifies the application program to close the temporary file after transmitting the response data unit.

5. The system for transmitting and dispatching data stream as claimed in claim 1, wherein the controller further repeatedly judges whether or not the data stream transmitted to the storage device from the host is written at the logical block address until a termination command is received from the application program, and erases the logical block address and notifies the application program to close the temporary file after receiving the termination command.

6. The system for transmitting and dispatching data stream as claimed in claim 4, wherein the communication data unit is a command-application protocol data unit (C-APDU), and the response data unit is a response-application protocol data unit (R-APDU).

7. A method for transmitting and dispatching data stream, suitable for transmitting data stream to a storage device having a non-volatile memory a controller and a smart card chip from a host, the method for transmitting and dispatching data stream comprising:
    setting a key between the host and the storage device;
    creating a temporary file on a logical block address of the non-volatile memory, generating a first value, generating a second value by encrypting the first value via the key and transmits a key verification writing command for writing the first value and the second value into the temporary file to the storage device by the host;
    receiving the key verification writing command with the first value and the second value, decrypting the received second value to obtain a third value, determining whether the third value is the same as the received first value and when the third value is the same as the received first value, recording the logical block address of the temporary file by the controller;
    judging whether the data stream transmitted to the storage device from the host is written to the logical block address of the temporary file by the controller; and
    wherein when the data stream is written to the logical block address of the temporary file, the data stream is then identified to be a communication data unit of the smart card chip, and is dispatched to the smart card chip by the controller.

8. The method for transmitting and dispatching data stream as claimed in claim 7, wherein the step of setting the key between the host and the storage device comprises:
    transmitting the key to the storage device from the host via a secure command;
    storing the key; and
    reading a key setting acknowledge message from the storage device for judging whether or not the key is successfully set.

9. The method for transmitting and dispatching data stream as claimed in claim 7, further comprising transmitting a response data unit after the smart card receives the data stream.

10. The method for transmitting and dispatching data stream as claimed in claim 9, further comprising:
    after transmitting the response data unit, erasing the logical block address and closing the temporary file.

11. The method for transmitting and dispatching data stream as claimed in claim 10, further comprising repeatedly judging whether or not the data stream transmitted to the storage device from the host is written at the logical block address until a termination command is received.

12. The method for transmitting and dispatching data stream as claimed in claim 11, further comprising:
    after receiving the termination command, erasing the logical block address and closing the temporary file.

13. A controller, for a storage device having a non-volatile memory and a smart card chip, the controller comprising:
    a micro processing unit;
    a memory interface, coupled to the micro processing unit for accessing the non-volatile memory;
    a buffer memory, coupled to the micro processing unit for temporarily storing data; and
    a data dispatching module, coupled to the micro processing unit,
    wherein the data dispatching module receives a key and stores the key,
    wherein the data dispatching module receives a key verification writing command for writing a first value and a second value into a temporary file, decrypts the received second value to obtain a third value, determines whether the third value is the same as the received first value and when the third value is the same as the received first value, records a logical block address of the temporary file,
    wherein the data dispatching module judges whether a data stream transmitted to the storage device from the host is written to the logical block address of the temporary file,
    wherein when the data stream is written to the logical block address of the temporary file, the data steam is then identified to be a communication data unit of the smart card chip and the data dispatching module dispatches the data stream to the smart card chip.

14. The controller as claimed in claim 13, wherein the key is set by the host.

15. The controller as claimed in claim 13, wherein the data dispatching module receives the key from the host via a secure command, stores the key and transmits a key setting acknowledge message to the host for notifying whether or not the key is successfully set.

16. The controller as claimed in claim 13, wherein the data dispatching module further transmits a key verification response message including the third value to the host.

17. The controller as claimed in claim 13, wherein the data dispatching module further receives a response data unit from the smart card chip, and transmits the response data unit to the host according to a read command of the host, and erases the logical block address and notifies the host to close the temporary file after transmitting the response data unit.

18. The controller as claimed in claim 13, wherein the data dispatching module further repeatedly judges whether or not the data stream transmitted to the storage device from the host is written at the logical block address until a termination command is received from the host, and erases the logical block address and notifies the host to close the temporary file after receiving the termination command.

19. The controller as claimed in claim 17, wherein the communication data unit is a C-APDU, and the response data unit is a R-APDU.

20. A method for transmitting and dispatching data stream, suitable for receiving data stream to be transmitted to a storage device having a non-volatile memory and a smart card chip from a host, the method for transmitting and dispatching data stream comprising:
    verifying a key verification writing command received from a host through a key;
    recording a logical block address of a temporary file in the non-volatile memory to be written by the key verification writing command when the verification of the key verification writing command is successful; and
    judging whether the data stream transmitted to the storage device from the host is written to the logical block address of the temporary file,
    wherein when the data stream is written to the logical block address of the temporary file, the data stream is then identified to be a communication data unit of the smart card chip, and is dispatched to the smart card chip.

* * * * *